(12) United States Patent
Hasegawa et al.

(10) Patent No.: US 12,466,654 B2
(45) Date of Patent: Nov. 11, 2025

(54) ARTICLE TRANSPORT FACILITY

(71) Applicant: Daifuku Co., Ltd., Osaka (JP)

(72) Inventors: Yutaka Hasegawa, Hinocho (JP); Naoki Douba, Hinocho (JP); Makoto Ueda, Hinocho (JP); Tetsuya Kuroki, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 564 days.

(21) Appl. No.: 17/964,351

(22) Filed: Oct. 12, 2022

(65) Prior Publication Data
US 2023/0114686 A1    Apr. 13, 2023

(30) Foreign Application Priority Data
Oct. 13, 2021  (JP) .................... 2021-167949

(51) Int. Cl.
*B65G 1/137* (2006.01)

(52) U.S. Cl.
CPC .................. *B65G 1/1376* (2013.01)

(58) Field of Classification Search
CPC .. B65G 1/0414; B65G 1/1376; B65G 1/0492; B65G 1/065; A47B 57/22; A47B 57/402; A47B 47/408
See application file for complete search history.

(56) References Cited

U.S. PATENT DOCUMENTS

| | | | |
|---|---|---|---|
| 2005/0051505 A1* | 3/2005 | Lewis ............... | B65G 1/06 211/151 |
| 2008/0302747 A1* | 12/2008 | Nance ............... | B65G 1/02 211/183 |
| 2013/0129456 A1* | 5/2013 | Salichs ............. | B65G 1/0492 414/277 |
| 2014/0072391 A1 | 3/2014 | Del Popolo | |
| 2015/0076090 A1* | 3/2015 | Heijmink ........... | B65G 1/04 211/49.1 |

FOREIGN PATENT DOCUMENTS

| | | |
|---|---|---|
| JP | 2000289816 A | 10/2000 |
| JP | 2006206270 A | 8/2006 |
| JP | 2007159948 A | 6/2007 |
| JP | 3155536 U | 11/2009 |
| JP | 2019119585 A | 7/2019 |
| JP | 202029345 A | 2/2020 |

* cited by examiner

*Primary Examiner* — Timothy R Waggoner
(74) *Attorney, Agent, or Firm* — The Webb Law Firm (57) ABSTRACT

An article transport facility includes support columns (2) and support beams (5) that are coupled to the support columns (2) and support rails (7). The support beams (5) each include a beam body (50), attachment members (55) for attachment to the support columns (2), and support members (60) that are fixed to the beam body (50) and are for supporting the rails (7). A support beam (5) and a support column (2) are coupled together by locking portions (59) provided on the attachment members (55) being locked to lock receiving portions (21) formed in the support column 2, and by binding with use of first binding members (B1) inserted through first through holes (66) formed in the support members (60).

11 Claims, 8 Drawing Sheets

ARTICLE TRANSPORT FACILITY

CROSS-REFERENCE TO RELATED APPLICATION

This application claims priority to Japanese Patent Application No. 2021-167949 filed Oct. 13, 2021, the disclosure of which is hereby incorporated by reference in its entirety.

BACKGROUND OF THE INVENTION

1. Field of the Invention

The present invention relates to an article transport facility.

2. Description of the Related Art

Article transport facilities in current use include transport vehicles that transport articles while traveling along rails. One example of such an article transport facility is disclosed in JP 2019-119585A (Patent Document 1).

The article transport facility disclosed in Patent Document 1 includes a carriage 12, and the carriage 12 includes a main carriage 18 that travels along first travel rails 13 and a sub carriage 19 that can be placed on the main carriage 18. Also, storage shelves 11 for storing articles W are provided in this article transport facility. The main carriage 18 travels along the first travel rails 13 with the sub carriage 19 placed thereon, and then the sub carriage 19 separates from the main carriage 18, travels along second travel rails 14, and transfers an article W to one of the storage shelves 11.

The article transport facility also includes support columns 39 that extend along the up-down direction. Although not explicitly stated in Patent Document 1, from the viewpoint of achieving strength, it is thought that the first travel rails 13 and the second travel rails 14 are supported by the support columns 39 indirectly via support beams that are coupled to the support columns 39.

It is often the case that the components of an article transport facility are manufactured and shipped individually, and then the components are assembled on site to complete the article transport facility, and it is desirable that the support columns and the support beams can be coupled to each other easily. Moreover, in addition to the ability to easily perform coupling, sufficient strength needs to be ensured.

SUMMARY OF THE INVENTION

In view of this, there is desire for the realization of an article transport facility in which support columns and support beams can easily coupled to each other while also ensuring sufficient strength.

An article transport facility according to an aspect of the present disclosure includes:
a rail extending along a first direction;
a transport vehicle configured to travel along the rail and transport an article;
a support column extending along an up-down direction; and
a support beam extending along a second direction intersecting the first direction in a vertical view along the up-down direction, the support beam being configured to be coupled to the support column and support the rail,
wherein the support column includes a lock receiving portion formed in a side surface of the support column,
the support beam includes:
a beam body extending along the second direction;
an attachment member configured to be attached to the support column; and
a support member configured to be fixed to the beam body and support the rail,
the attachment member includes:
a first fixing portion configured to be fixed to the beam body;
a first contact portion configured to come into contact with the side surface of the support column; and
a locking portion formed on the first contact portion,
the support member includes:
a second fixing portion configured to be fixed to the beam body;
a support portion configured to come into contact with the rail and support the rail; and
a first through hole at a position different from the support portion, and
the support beam and the support column are configured to be coupled by (i) the attachment member being attached to the support column by the locking portion being locked to the lock receiving portion, and (ii) the support member and the support column being bound together by a first binding member inserted through the first through hole.

According to this configuration, through using both the attachment of the attachment member to the support column by locking and the binding of the support member to the support column by the first binding member, it is possible to achieve both workability and strength for the coupling between the support beam and the support column. For example, compared to the case of achieving coupling by simply locking, binding with the first binding member makes it possible to increase the strength with respect to a load acting on the beam body. Also, compared to the case of achieving coupling by simply the first binding member, the number of first binding members can be reduced by an amount corresponding to the number of coupling points achieved by locking, and the amount of labor required for assembly can be reduced. As described above, according to the article transport facility of this configuration, it is possible to easily couple the support column and the support beam while also ensuring sufficient strength.

Further features and advantages of the technology according to the present disclosure will become apparent from the following description of exemplary and non-limiting embodiments described with reference to the drawings.

DESCRIPTION OF THE INVENTION

Figure 1:
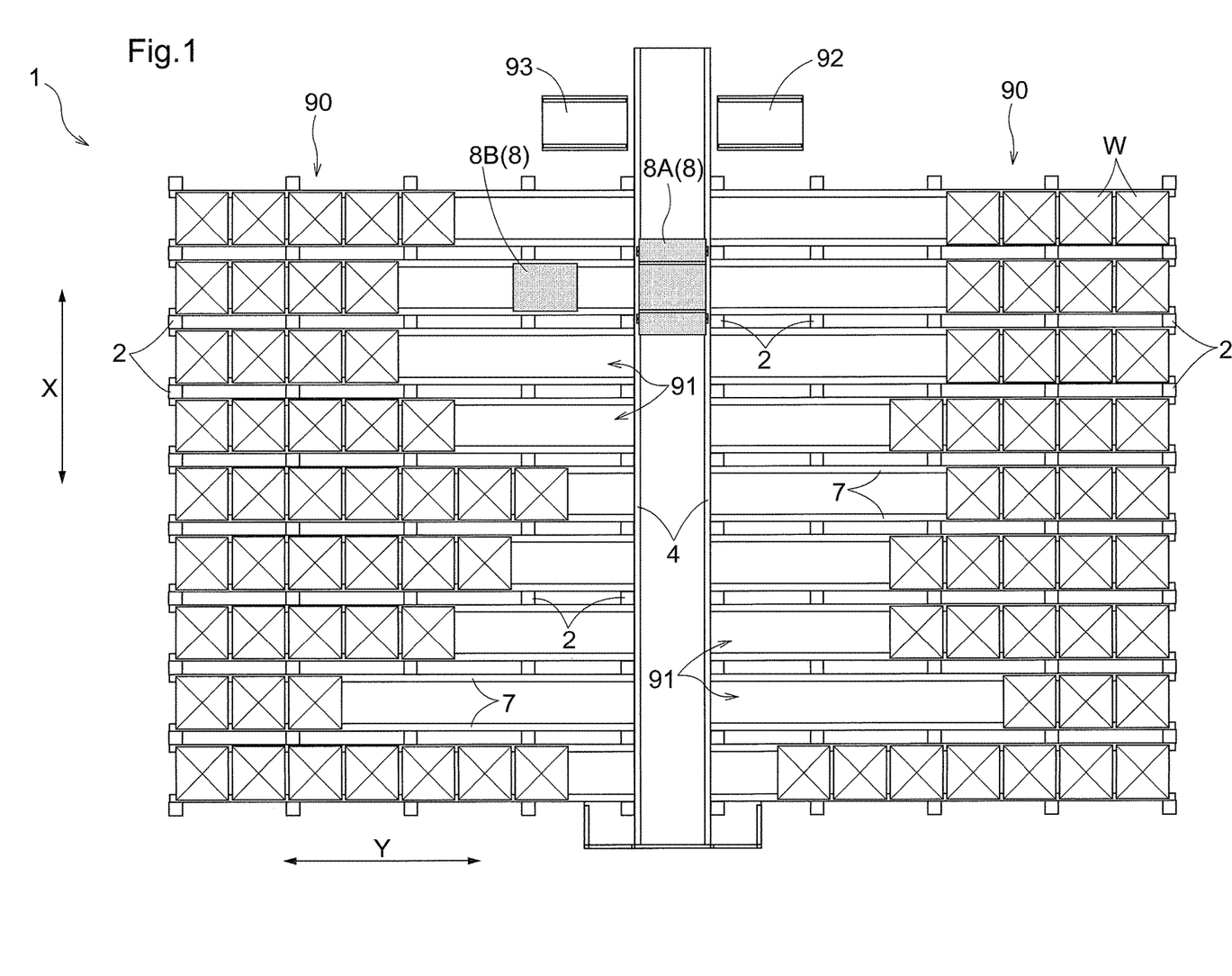
FIG. 1 is a plan view of an article transport facility.
Figure 2:
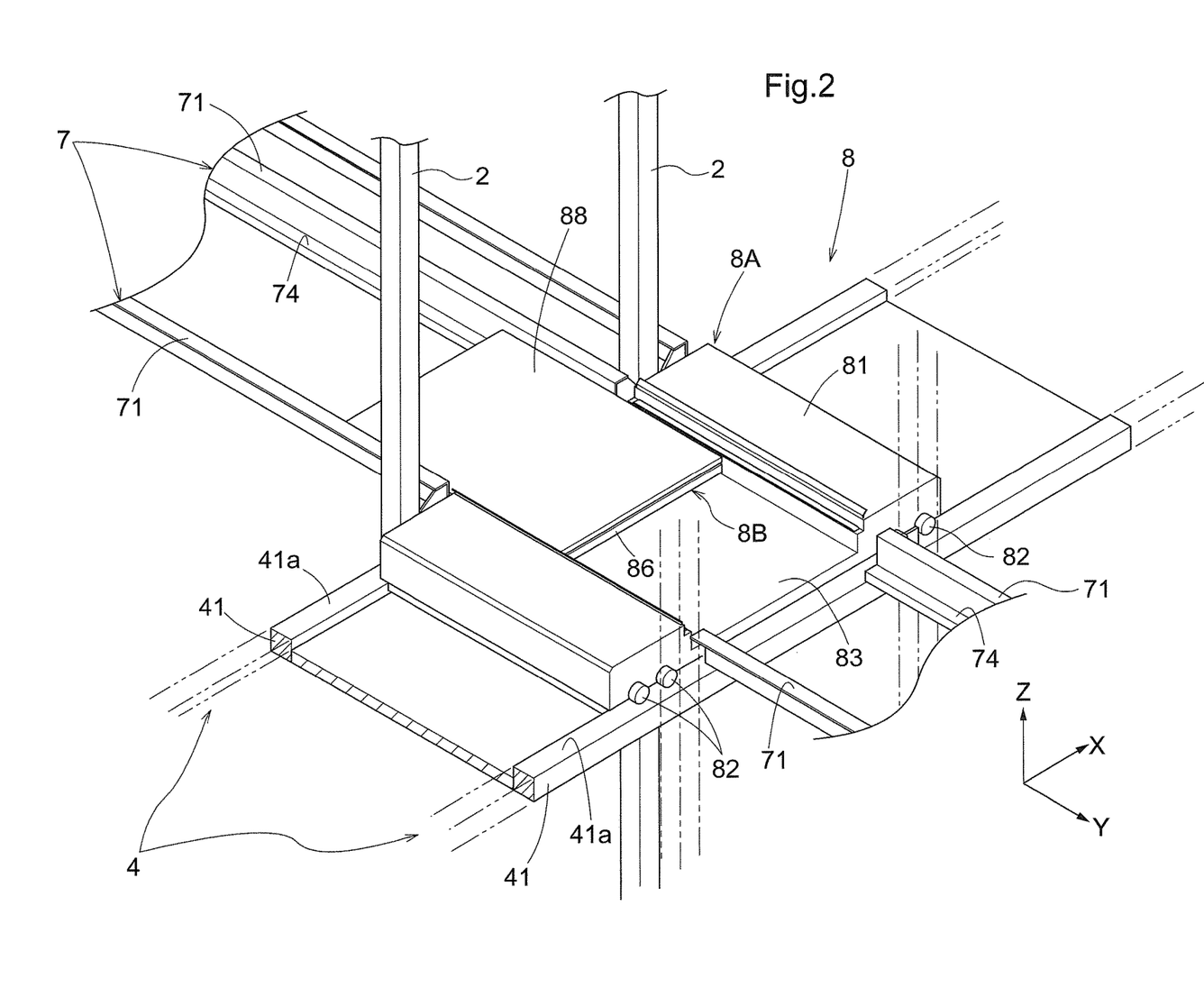
FIG. 2 is a perspective view of an article transport vehicle.
Figure 3:
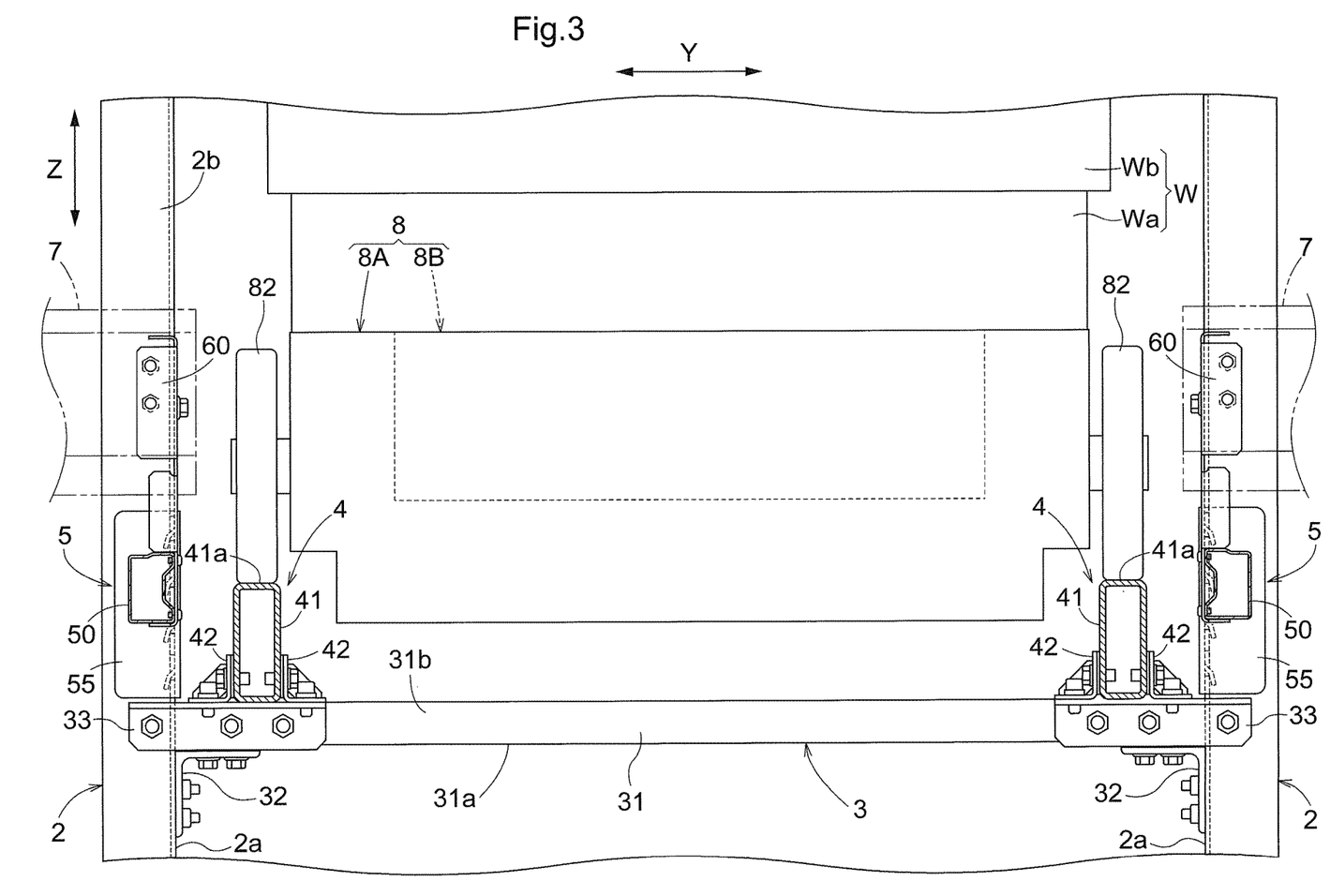
FIG. 3 is a front view of a longitudinal cross-section of a portion of the article transport facility.
Figure 4:
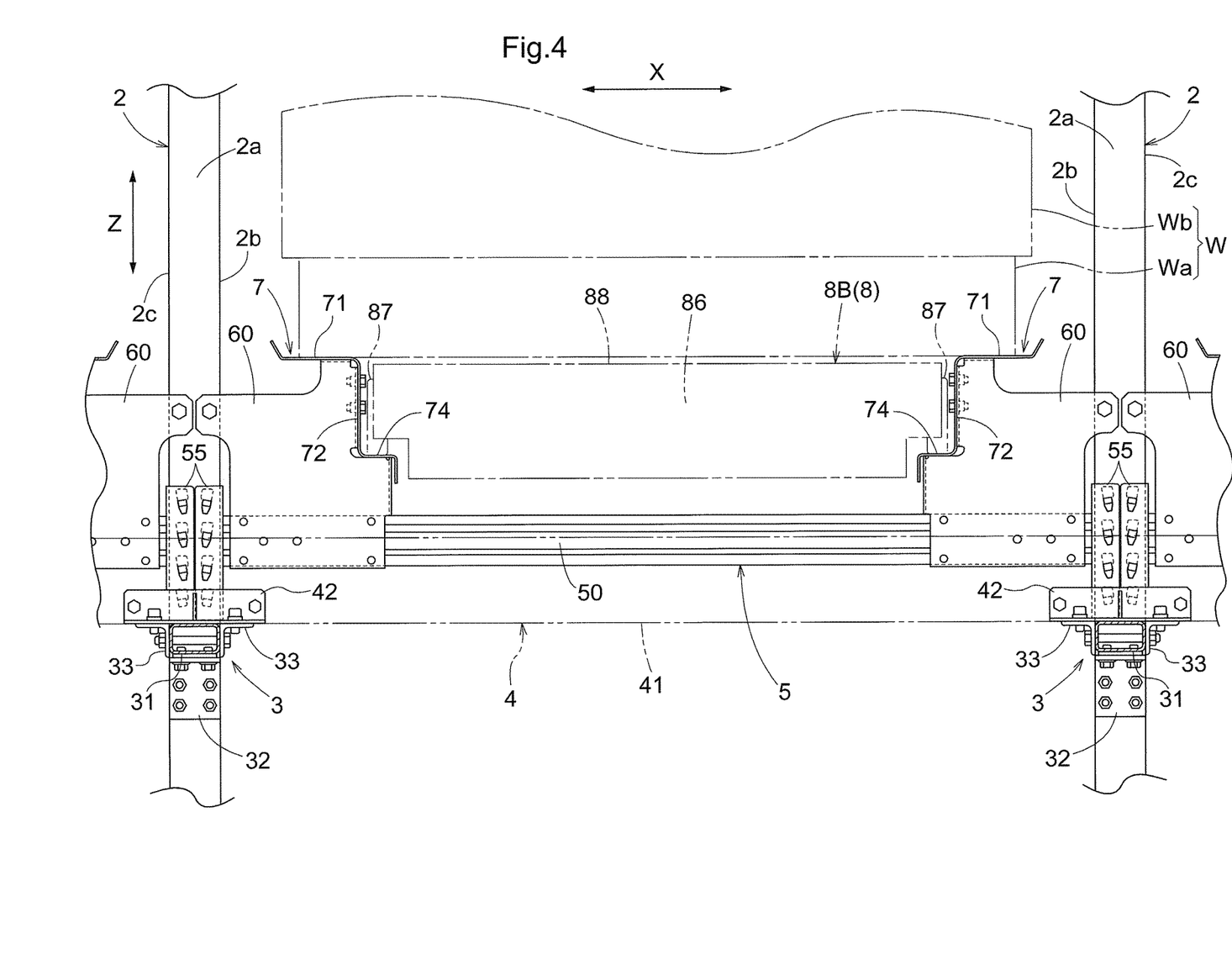
FIG. 4 is a side view of a longitudinal cross-section of a portion of the article transport facility.

An embodiment of an article transport facility will be described below with reference to the drawings. As shown in FIGS. 1 and 2, the article transport facility 1 of the present embodiment includes support columns 2, first travel rails 4 fixed to the support columns 2, second travel rails 7 fixed to the support columns 2, and an article transport vehicle 8 that travels along the first travel rails 4 and the second travel rails 7 and transports an article W. As shown in FIGS. 3 and 4, the article transport facility 1 also includes first beam units 3 that are coupled to the support columns 2 and support the first travel rails 4, and second beam units 5 that are coupled to the support columns 2 and support the second travel rails 7.

The support columns 2, the first travel rails 4, and the second travel rails 7 extend along directions that intersect each other. In the following description, the extending direction of the support columns 2 is referred to as the "Z direction", the extending direction of the first travel rails 4, which intersects the Z direction (is orthogonal thereto, in this example), is referred to as the "X direction", and the extending direction of the second travel rails 7, which intersects (perpendicularly in this example) both the Z direction and the X direction, is referred to as the "Y direction". Note that in this example, the Z direction is the up-down direction (vertical direction), and the direction in which the X direction and the Y direction intersect each other (are orthogonal to each other, in this example) is the horizontal direction.

In the present embodiment, the X direction corresponds to a "second direction", the Y direction corresponds to a "first direction", and the Z direction corresponds to the "up-down direction".

The article transport facility 1 also includes storage shelves 90 for storing articles W. In the present embodiment, the storage shelves 90 are provided on both sides of the first travel rails 4 in the Y direction. Each of the storage shelves 90 has a plurality of storage sections 91. Each of the storage sections 91 is able to store a plurality of articles W along the Y direction. A plurality of storage sections 91 are arranged side by side along the X direction. In the present embodiment, the storage sections 91 are constituted using the support columns 2 and the second travel rails 7. Specifically, placement surface portions 71 on which articles W can be placed are formed on the second travel rails 7 supported by the support columns 2, and each of the storage sections 91 is constituted by one placement surface portion 71 formed on a pair of second travel rails 7 that are adjacent and face each other in the X direction.

Examples of the article W include a pallet Wa on which a load Wb is placed, and an empty pallet Wa (not having a load Wb placed thereon). Of course, other items may be transported as the articles W.

As shown in FIGS. 1 and 2, the article transport vehicle 8 is constituted by a main carriage and a sub carriage. The article transport vehicle 8 includes a main carriage 8A that travels along the X direction on the first travel rails 4, and a sub carriage 8B that travels along the Y direction on the second travel rails 7. The main carriage 8A is able to travel along the first travel rails 4 with the sub carriage 8B placed thereon. The sub carriage 8B is able to move in the X direction while placed on the main carriage 8A, and also able to travel in the Y direction while separated from the main carriage 8A.

In the present embodiment, the main carriage 8A corresponds to a "second transport vehicle", and the sub carriage 8B corresponds to a "transport vehicle". Also, the first travel rails 4 corresponds to "second rails", and the second travel rails 7 corresponds to "rails".

The main carriage 8A includes a carriage body 81 and traveling wheels 82. The traveling wheels 82 roll on traveling surface portions 41a of rail bodies 41 that constitute the first travel rails 4. The main carriage 8A travels along the first travel rails 4 due to the traveling wheels 82 being driven to rotate by a drive device such as an electric motor. The carriage body 81 includes an in-vehicle rail 83 that extends in the Y direction. The sub carriage 8B can be placed on the in-vehicle rail 83, and the sub carriage 8B can travel on the in-vehicle rail 83.

The sub carriage 8B includes a carriage body 86 and traveling wheels 87 (see FIG. 4). The traveling wheels 87 roll on traveling surface portions 74 of the second travel rails 7. The sub carriage 8B travels along the second travel rails 7 due to the traveling wheels 87 being driven to rotate by a drive device such as an electric motor. The traveling wheels 87 also roll on the in-vehicle rail 83 of the main carriage 8A. The sub carriage 8B travels along the in-vehicle rail 83 due to the traveling wheels 87 being driven to rotate. Note that while the main carriage 8A is stopped at a predetermined position on the first travel rails 4, the in-vehicle rail 83 and the second travel rails 7 are in a positional relationship of being continuous with each other, and the sub carriage 8B can travel back and forth between the in-vehicle rail 83 and the second travel rails 7.

The sub carriage 8B also includes a support surface portion 88 for supporting the article W. The support surface portion 88 can be raised and lowered between a raised position, which is above the placement surface portions 71 of the second travel rails 7 constituting the storage sections 91 in the present embodiment, and a lowered position, which is below the placement surface portions 71. If the support surface portion 88 is lowered from the raised position to the lowered position while the sub carriage 8B is on the second travel rails 7, the article W supported by the support surface portion 88 can be transferred to one of the placement surface portions 71 and stored in the corresponding storage section 91. If the support surface portion 88 is raised from the lowered position to the raised position while the sub carriage 8B is on the second travel rails 7, an article W stored in one of the storage sections 91 can be lifted from the corresponding placement surface portion 71 by the support surface portion 88, and that article W can be supported on the support surface portion 88.

Articles W that are to be stored on the storage shelves 90 are transported from the outside to a loading section 92. Articles W that are to be stored on the storage shelves 90 are transported from the loading section 92 to the storage shelves 90 (specifically, the storage sections 91) by the article transport vehicle 8. At this time, first, an article W is transferred from the loading section 92 to the sub carriage 8B placed on the main carriage 8A. Next, the main carriage 8A, which has the sub carriage 8B placed thereon, is caused to travel to a position corresponding to the target storage section 91 and the corresponding second travel rails 7. Next, the support surface portion 88 of the sub carriage 8B is raised, and, while supporting the article W, the sub carriage 8B is caused to move from the in-vehicle rail 83 to the second travel rails 7 and move to the position where the article W is to be stored. After that, the support surface portion 88 is lowered so as to place the article W on the pair of second travel rails 7 (the placement surface portion 71), and thus the article W is stored in the storage section 91.

Articles W unloaded from the storage shelves 90 are carried away from an unloading section 93. Articles W unloaded from the storage shelves 90 are transported from the storage shelves 90 (specifically, the storage sections 91) to the unloading section 93 by the article transport vehicle 8. At this time, first, the sub carriage 8B is moved to a position directly under an article W that is to be unloaded, and then the support surface portion 88 of the sub carriage 8B is raised such that the article W is supported by the sub carriage 8B. Next, the sub carriage 8B is moved to the main carriage 8A. Next, the main carriage 8A with the sub carriage 8B placed thereon is caused to travel to a position corresponding to the unloading section 93. After that, the article W is transferred from the sub carriage 8B to the unloading section 93.

The first travel rails 4 and the second travel rails 7, which constitute tracks for the article transport vehicle 8 (the main carriage 8A and the sub carriage 8B), are supported by the support columns 2 by being coupled to the support columns 2 via first beam units 3 and second beam units 5, respectively. In the present embodiment, the first beam units 3 correspond to "second support beams", and the second beam units 5 correspond to "support beams".

The article transport facility 1 includes a plurality of the support columns 2. The support columns 2 are arranged at a plurality of locations in the X direction and the Y direction. Specifically, a plurality of support columns 2 are arranged side by side along the X direction, and a plurality of support columns 2 are also arranged side by side along the Y direction. Each support column 2 is provided upright on the floor and extends along the Z direction. The support columns 2 can be shaped steel members such as lip channel steel members, for example.

Figure 6:
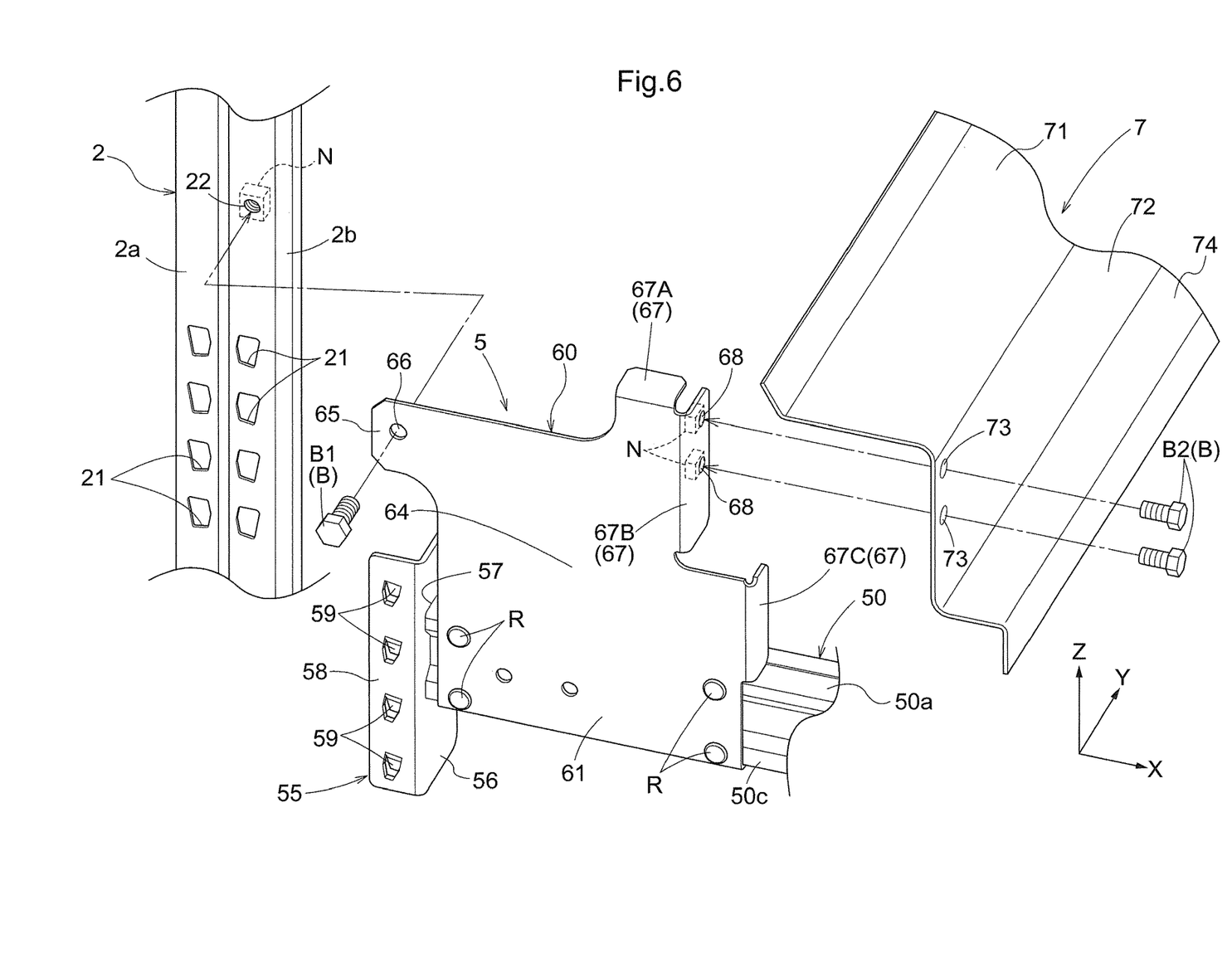
FIG. 6 is an exploded perspective view of a coupling region between a support column, a second support beam, and a second travel rail.

As shown in FIGS. 4 and 6, each of the support columns 2 has a first side surface 2a that faces in the Y direction, and a second side surface 2b and a third side surface 2c that face in the X direction on opposite sides of the first side surface 2a. Lock holes 21 and a through hole 22 are formed in the first side surface 2a of the support column 2. The lock holes 21 are arranged side by side along the X direction and the Z direction. The through hole 22 is provided above lock holes 21. In the present embodiment, the first side surface 2a corresponds to the "side surface", and the lock holes 21 correspond to "lock receiving portions".

As shown in FIG. 3, the first beam units 3 couple together a plurality of support columns 2 arranged side by side along the Y direction. As shown in FIGS. 3 and 4, each of the first beam units 3 includes a first beam body 31 that extends along the Y direction, and lower coupling members 32 and side coupling members 33 for coupling the support columns 2 to the first beam body 31. The first beam body 31 extends across a pair of support columns 2 arranged side by side along the Y direction. The first beam body 31 is shaped as a tube having a rectangular cross section. The first beam body 31 can be a rectangular steel pipe or the like, for example.

The lower coupling member 32 is fixed to the lower surface of the first beam body 31 and also fixed to the first side surface 2a of the support column 2, thereby coupling the support columns 2 to the first beam body 31 from below. A pair of side coupling members 33 are provided. One of the two side coupling members 33 is fixed to one side surface of the first beam body 31 and also fixed to the second side surface 2b of the corresponding support column 2, and the other side coupling member 33 is fixed to the other side surface of the first beam body 31 and also fixed to the third side surface 2c of the corresponding support column 2, thus coupling the support columns 2 to the first beam body 31 from opposite sides.

Note that the first beam units 3 respectively couple pairs of support columns 2 arranged at different positions in the X direction. Accordingly, a plurality of first beam units 3, each of which extends along the Y direction and is coupled to a pair of support columns 2, are arranged side by side along the X direction. A plurality of first beam units 3 arranged side by side along the X direction support, from below, the first travel rails 4 that extend along the X direction.

The first travel rails 4 are supported from below by the first beam units 3 and extend along the X direction. Each of the first travel rails 4 includes a rail body 41 that extends along the X direction and rail coupling members 42 for coupling the rail body 41 to the first beam bodies 31. The rail body 41 is shaped as a tube having a rectangular cross section. The upper surface of the rail body 41 is a traveling surface portion 41a. The traveling wheels 82 of the main carriage 8A roll on the traveling surface portions 41a, and thus the main carriage 8A travels along the first travel rails 4. The rail coupling members 42 couple the side surfaces of the rail body 41 to the side coupling members 33 of the first beam bodies 31, from opposite sides of the rail body 41 in the Y direction.

Figure 5:
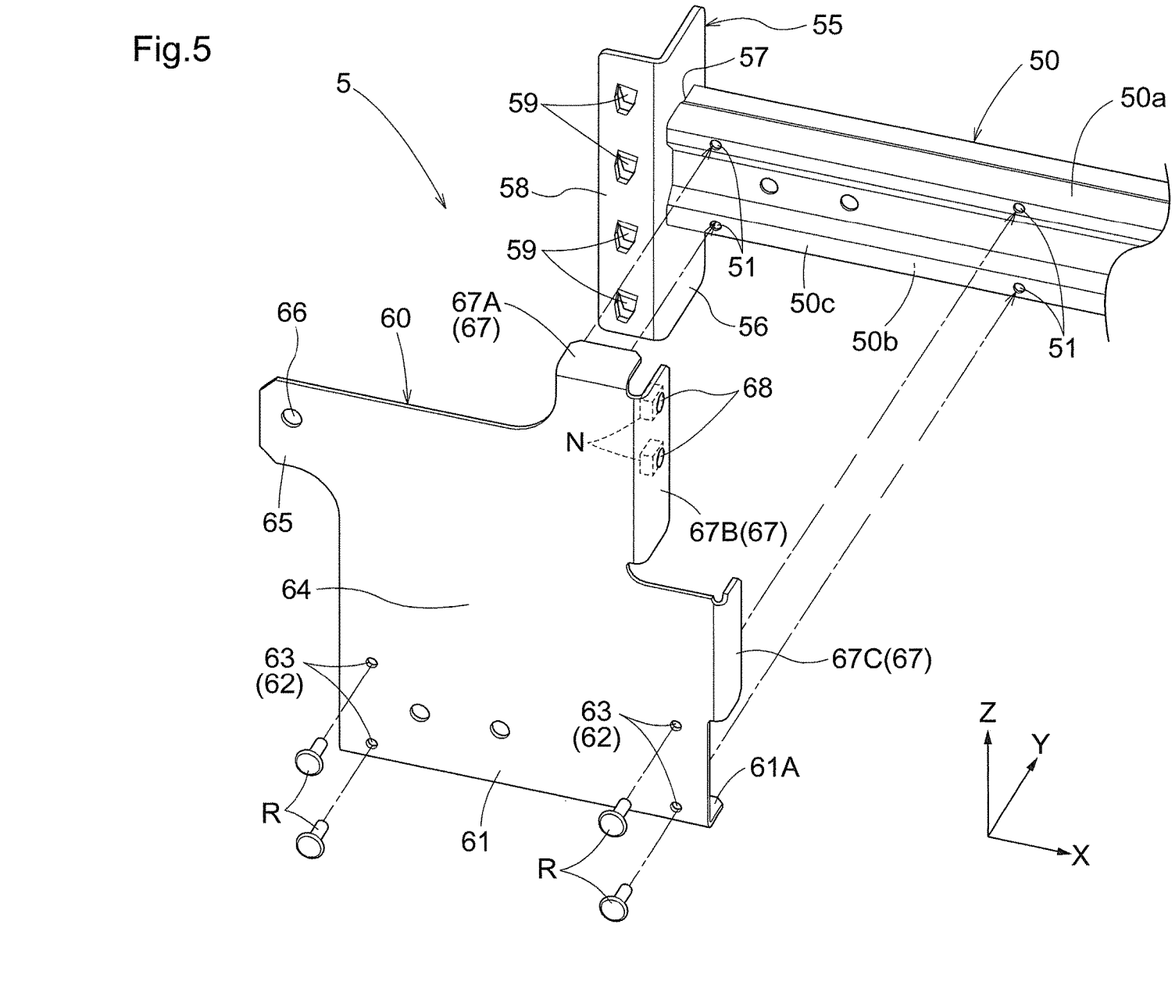
FIG. 5 is an exploded perspective view of a portion of a second support beam.

As shown in FIG. 4, the second beam units 5 couple together a plurality of support columns 2 arranged side by side in the X direction. As shown in FIGS. 4 and 5, each of the second beam units 5 includes a second beam body 50, attachment members 55, and support members 60.

Each of the second beam bodies 50 extends along the X direction. The second beam body 50 extends between a pair of support columns 2 arranged side by side along the X direction. The second beam body 50 is shaped as a tube having a rectangular cross section. The second beam body 50 can be a square steel pipe or the like, for example. As shown in FIG. 5, the second beam body 50 has an upper surface 50a, a lower surface 50b, and side surfaces 50c that face the Y direction. The side surfaces 50c of the second beam body 50 serve as contact surfaces that come into contact with the support members 60. A plurality of through holes 51 are formed in the side surfaces 50c in regions of the second beam body 50 corresponding to end portions in the X direction. In the present embodiment, the second beam body 50 corresponds to a "beam body".

The attachment members 55 are fixed to the second beam body 50 and attached to the support columns 2. Angle steel members (L-shaped angle members), for example, can be used as the attachment members 55. The attachment members 55 each include a first contact surface portion 56 that comes into contact with one of the second side surfaces 2b of the support column 2 that face the X direction, and a second contact surface portion 58 that comes into contact with the first side surface 2a of the support column 2 that faces the Y direction. The first contact surface portion 56 and the second contact surface portion 58 are each flat plate-shaped, and respectively come into full contact with the second side surface 2b and the first side surface 2a of the support column 2. In the present embodiment, the second contact surface portion 58 corresponds to a "first contact portion".

Each of the attachment members 55 also includes a first fixing portion 57 and locking claws 59. The first fixing portion 57 is the portion that is fixed to the second beam body 50, and is provided on the first contact surface portion 56. In the present embodiment, the attachment member 55 and the second beam body 50 are fixed by welding the front surface of the attachment member 55 to an X-direction edge of the second beam body 50, and the first fixing portion 57 is constituted as a weld portion that extends along the edge of the second beam body 50. Note that in this example, the first fixing portion 57 is provided on the front surface of the first contact surface portion 56, which is the surface on the side opposite to the surface that faces the support column 2.

The locking claws 59 are formed on the second contact surface portion 58. The locking claws 59 are formed by cutting and raising portions of the second contact surface portion 58. The locking claws 59 are formed as claw portions that face downward. In the present embodiment, a plurality of locking claws 59 are arranged side by side along the Z direction. The locking claws 59 are inserted through the lock holes 21 formed in the first side surface 2a of the support column 2 and locked to the edges of the lock holes 21 from above. In the present embodiment, the locking claws 59 correspond to "locking portions".

The support members 60 are fixed to the second beam bodies 50 and support the second travel rails 7. Each of the support members 60 includes a third contact surface portion 61, an extension portion 64, a fourth contact surface portion 65, and a support portion 67.

The third contact surface portion 61 comes into contact with one of the side surfaces 50c of the second beam body 50, which faces in the Y direction. The third contact surface portion 61 has a flat plate shape. The third contact surface portion 61 is provided with a second fixing portion 62 that is to be fixed to the second beam body 50. In the present embodiment, the third contact surface portion 61 includes a plurality of through holes 63, and the second fixing portion 62 includes the through holes 63. The through holes 51 formed in the side surface 50c of the second beam body 50 and the through holes 63 formed in the third contact surface portion 61 of the support member 60 are in a corresponding positional relationship. The through holes 51 and the through holes 63 are overlapped with each other in a view in the Y direction, and then the third contact surface portion 61 and the second beam body 50 are riveted together by rivets R inserted through the through holes, thus fixing together the second beam body 50 and the support member 60.

In the present embodiment, the third contact surface portion 61 corresponds to a "third contact portion", and the through holes 63 formed in the third contact surface portion 61 correspond to "second through holes". Also, the rivets R correspond to a "second binding member", and riveting with the rivets R is an example of "binding".

Note that in the present embodiment, the lower end portion of the third contact surface portion 61 is provided with a bent piece portion 61A that is bent in the Y direction. The bent piece portion 61A extends over the entirety of the lower end portion of the third contact surface portion 61 (the entire range thereof in the X direction). In the present embodiment, the support member 60 is fixed to the second beam body 50 in a state where the upper surface of the bent piece portion 61A is in contact with the lower surface 50b of the second beam body 50. Thereby, the bent piece portion 61A has a function of positioning the support member 60 relative to the second beam body 50.

The extension portion 64 extends upward from the third contact surface portion 61, which is provided with the second fixing portion 62. The extension portion 64 is continuous with the third contact surface portion 61. The extension portion 64 is a flat plate-shaped portion provided in the central region of the support member 60, and connects the third contact surface portion 61, which is provided with the second fixing portion 62, to the fourth contact surface portion 65, which is provided with a later-described through hole 66. In the present embodiment, the extension portion 64 corresponds to a "connecting portion" that connects the third contact surface portion 61 and the fourth contact surface portion 65.

The fourth contact surface portion 65 comes into contact with the first side surface 2a of the support column 2. The fourth contact surface portion 65 comes into contact with the first side surface 2a at a position above the attachment member 55. As shown in FIGS. 4 and 6, the fourth contact surface portion 65 projects in the X direction from an upper portion of the extension portion 64 that has a deformed rectangle-like shape. The fourth contact surface portion 65 is plate-shaped. In the present embodiment, the third contact surface portion 61, the fourth contact surface portion 65, and the extension portion 64 connecting them are flat plate-shaped overall. In other words, the third contact surface portion 61, the extension portion 64, and the fourth contact surface portion 65 are shaped as plates that extend along the same plane.

The fourth contact surface portion 65 is provided at a position spaced apart upward from the attachment member 55. Although not particularly limited in this way, the upward separation distance of the fourth contact surface portion 65 from the attachment member 55 can be greater than or equal to the distance between a pair of locking claws 59 that are adjacent in the Z direction, for example. Alternatively, the upward separation distance can be set to approximately the size of the second beam body 50 in the Z direction, for example.

A through hole 66 is provided in the fourth contact surface portion 65. In the present embodiment, one through hole 66 is provided near the central portion of the substantially rectangular fourth contact surface portion 65. When the locking claws 59 of the attachment member 55 are locked in the lock holes 21 formed in the first side surface 2a of the support column 2, the through hole 66 becomes overlapped with the through hole 22 formed in the first side surface 2a of the support column 2 in a view in the Y direction. In the present embodiment, the fourth contact surface portion 65 corresponds to a "second contact portion" and a "hole forming portion", and the through hole 66 corresponds to a "first through hole".

The support portion 67 is a portion that comes into contact with a second travel rail 7 and supports the second travel rail 7. With respect to the X direction, the support portion 67 is provided on the extension portion 64 on the side opposite to the fourth contact surface portion 65 provided with the through hole 66. In other words, the fourth contact surface portion 65 and the support portion 67 are separated from each other on one side of the extension portion 64 and the other side of the extension portion 64 in the X direction. The support portion 67 of the present embodiment is integrated with the extension portion 64. Also, a portion that extends continuously from the extension portion 64 is bent in the Y direction to form the support portion 67. The support portion 67 of the present embodiment includes a plurality of bent piece portions, and specifically includes a first bent piece portion 67A, a second bent piece portion 67B, and a third bent piece portion 67C.

The first bent piece portion 67A is connected to an upper portion of the extension portion 64 and extends along the X direction and the Y direction. The second bent piece portion 67B is connected to a portion where an upper corner of the extension portion 64 was cut out in a rectangular shape, and extends along the Z direction and the Y direction. Through holes 68 are formed in the second bent piece portion 67B. In the present embodiment, a plurality of (two in this example) through holes 68 are formed side by side along the Z direction in the second bent piece portion 67B. The third bent piece portion 67C is connected to a side portion of the extension portion 64 at a position below the second bent piece portion 67B, and extends along the Z direction and the Y direction.

Note that although FIG. 5 shows the coupling relationship between the second beam body 50 and the support member 60 at an end portion of the second beam body 50 on one side in the X direction, the second beam body 50 and the support member 60 are coupled in a similar manner at the end portion on the other side in the X direction. At this time, as shown in FIG. 4, the support member 60 arranged on one side in the X direction and the support member 60 arranged on the other side in the X direction are arranged in mirror symmetry with each other relative to the vertical plane at the center position in the X direction.

As shown in FIG. 6, the support column 2 and the second beam unit 5 are coupled through a combination of locking with the locking claws 59 and fastening with bolts B. Specifically, the attachment member 55 is attached to the support column 2 by locking the locking claws 59 provided on the attachment member 55 to the lock holes 21 provided in the first side surface 2a of the support column 2. In this state, the support member 60 and the support column 2 are fastened by a first bolt B1 inserted through the through hole 66 provided in the fourth contact surface portion 65 of the support member 60 and the through hole 22 provided in the first side surface 2a of the support column 2. Note that a nut N is arranged opposite to the first bolt B1 on the other side of the support member 60 and the first side surface 2a of the support column 2 (in this example, on the rear surface side of the support column 2), and the support column 2 and the support member 60 are fixed by screwing the first bolt B1 into the nut N. Accordingly, the support column 2 and the second beam unit 5 are coupled to each other.

In the present embodiment, the first bolt B1 corresponds to a "first binding member", and the fastening by the first bolt B1 and the nut N screwed therewith is an example of the "binding".

In this way, by coupling the support column 2 and the second beam unit 5 through a combination of locking with the locking claws 59 and fastening with the bolt B, it is possible to achieve both workability and strength for the coupling between the support column 2 and the second beam unit 5. For example, compared to the case of achieving coupling by simply locking with the locking claws 59, fastening with the bolt B makes it possible to increase the strength with respect to a load acting on the second beam body 50. Also, compared to the case of achieving coupling by simply fastening with bolts B, the number of fastening points can be reduced by an amount corresponding to the number of coupling points achieved by locking with the locking claws 59, and the amount of labor required for assembly can be reduced. Moreover, due to the support column 2 and the second beam unit 5 being coupled through a combination of locking with the locking claws 59 and fastening with the bolt B, and due to the support member 60 and the second beam body 50 being fixed by riveting with the rivets R, the number of welding points can be reduced, and the manufacturing cost can be reduced. In this way, according to the article transport facility 1 of the present embodiment, it is possible to easily couple the support column 2 and the second beam unit 5 while also ensuring sufficient strength, at low cost.

Also, if the fourth contact surface portion 65 is provided at a position spaced apart upward from the attachment member 55 as in the present embodiment, resistance to momentum acting on the second beam body 50 is increased, and strength can be further increased. A longer upward separation distance of the fourth contact surface portion 65 (through hole 66) from the attachment member 55 is preferable due to achieving a larger resistance to momentum. On the other hand, if the fourth contact surface portion 65 (through hole 66) is spaced too far apart upward, the support member 60 becomes excessively elongated, and the overall strength can possibly decrease. In consideration of these factors, the upward separation distance of the fourth contact surface portion 65 (through hole 66) from the attachment member 55 is set to an appropriate distance that achieves a balance between both factors.

Also, in the present embodiment, the support column 2 and the second beam unit 5 are coupled while the first side surface 2a of the support column 2 and the inward surface of the second contact surface portion 58 (the surface facing the support column 2) of the attachment member 55 are in contact with each other, and furthermore while the second side surface 2b of the support column 2 and the inward surface of the first contact surface portion 56 (the surface facing the support column 2) of the attachment member 55 are in contact with each other. Due to the gapless contact not only between the first side surface 2a of the support column 2 and the second contact surface portion 58 but also between the second side surface 2b of the support column 2 and the first contact surface portion 56, it is possible to further increase resistance to momentum acting on the second beam body 50. Accordingly, the strength of the coupling between the support column 2 and the second beam unit 5 can be further increased.

Note that the second beam units 5 respectively couple pairs of support columns 2 arranged at different positions in the Y direction. Accordingly, a plurality of second beam units 5, each of which extends along the X direction and is coupled to a pair of support columns 2, are arranged side by side along the Y direction. A plurality of second beam units 5 arranged side by side along the Y direction support, from below, the second travel rails 7 that extend along the Y direction.

As shown in FIG. 6, the second travel rails 7 supported by the second beam units 5 are each configured by bending a thin plate-like steel material into a step-like shape. The second travel rails 7 extend along the Y direction. Each of the second travel rails 7 includes a placement surface portion 71, a traveling surface portion 74, and a coupling portion 72 that couples these two portions to each other. As described above, the placement surface portion 71 is a portion on which an article W is placed, and forms both a portion of the second travel rail 7 and also a portion of the storage section 91. Also, the traveling surface portion 74 is a portion on which the traveling wheels 87 of the sub carriage 8B roll, and serves as a track for the sub carriage 8B. The traveling surface portion 74 is arranged below the placement surface portion 71.

The coupling portion 72 couples the placement surface portion 71 and the traveling surface portion 74 in the Z direction. Through holes 73 are formed in a Y-direction end portion of the coupling portion 72. In the present embodiment, a plurality of (two in this example) through holes 73 are formed side by side along the Z direction in the coupling portion 72. The through holes 68 formed in the second bent piece portion 67B of the support member 60 and the through holes 73 formed in the coupling portion 72 are in a corresponding positional relationship. The support member 60 and the second travel rail 7 are fixed to each other by arranging the through holes 68 and the through holes 73 so as to overlap each other in a view along the X direction, and then fastening the second bent piece portion 67B and the coupling portion 72 to each other with bolts B (here, two second bolts B2) inserted through the overlapping through holes.

Figure 7:
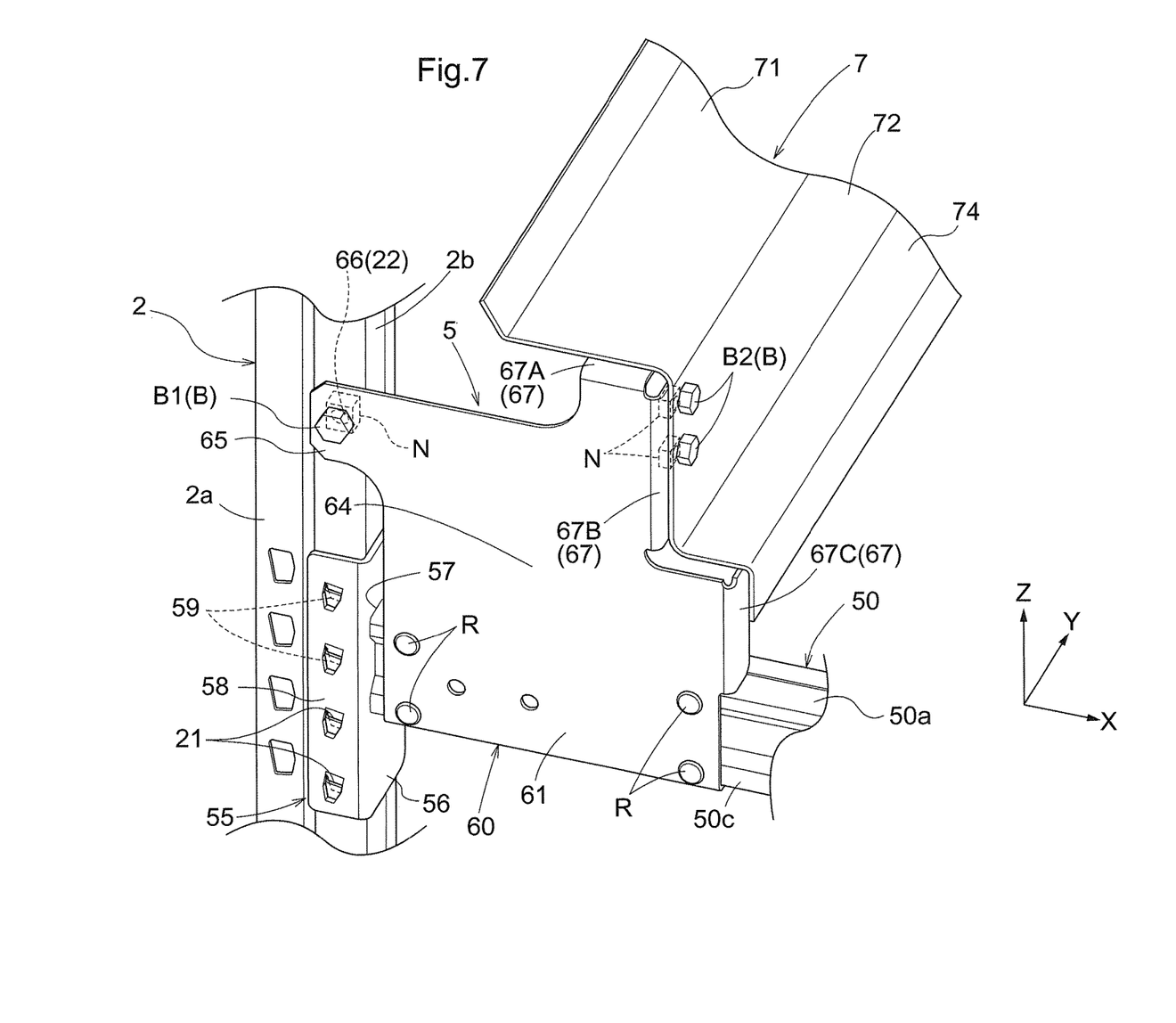
FIG. 7 is a perspective view of a coupling region between a support column, a second support beam, and a second travel rail.

Note that nuts N are arranged opposite to the second bolts B2 on the other side of the second bent piece portion 67B and the coupling portion 72 (in this example, on the rear surface side of the coupling portion 72), and the support member 60 and the second travel rail 7 are fixed to each other by screwing the second bolts B2 into the nuts N. At this time, as shown in FIG. 7, the support portion 67 of the support member 60 supports the second travel rail 7 in a state where the upper surface of the first bent piece portion 67A is in contact with the placement surface portion 71 from below, and the upper edge of the third bent piece portion 67C is in contact with the traveling surface portion 74 from below.

Figure 8:
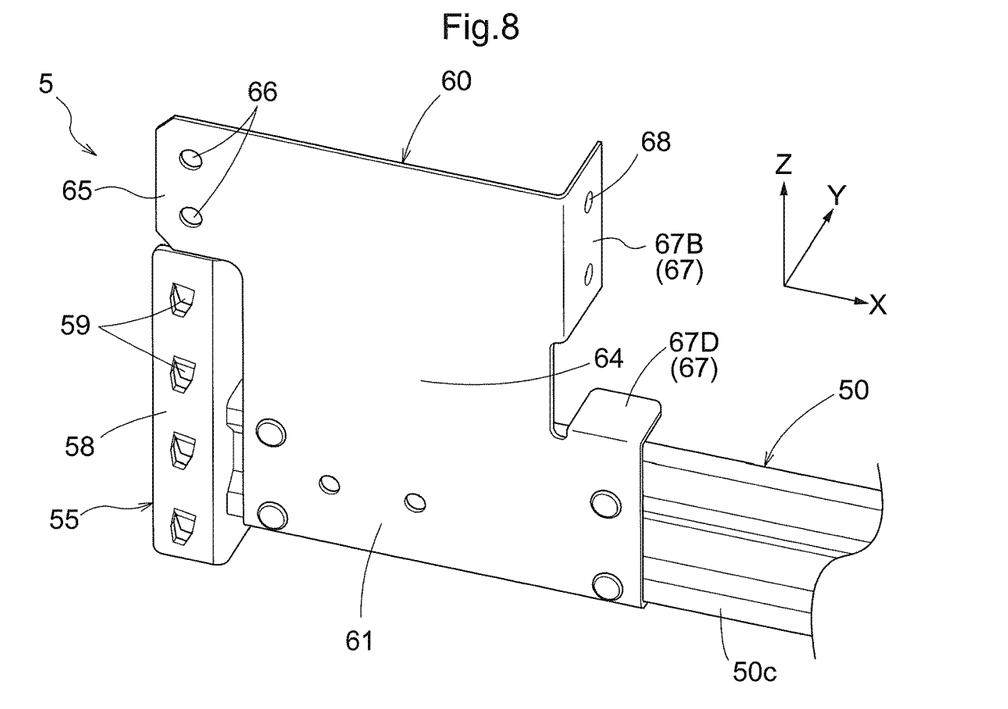
FIG. 8 is a perspective view of a portion of a support beam according to another aspect.

Other Embodiments (1) In the above embodiment, an example is described in which the fourth contact surface portion 65 is provided at a position spaced apart upward from the attachment member 55. However, the present invention is not limited to such a configuration, and as shown in FIG. 8 for example, instead of the fourth contact surface portion 65 and the attachment member 55 being spaced apart, the fourth contact surface portion 65 may be provided at a position directly above the attachment member 55. In this case, the upper end portion of the attachment member 55 (here, the second contact surface portion 58) and the lower end portion of the fourth contact surface portion 65 may be in contact with each other, or may be adjacent to each other with a slight gap therebetween. Note that in the example in FIG. 8, a plurality of (specifically, two) through holes 66 are formed side by side along the Z direction in the fourth contact surface portion 65. Also, in the example shown in FIG. 8, the support portion 67 of the support member 60 is constituted by two bent piece portions (a second bent piece portion 67B and a fourth bent piece portion 67D). The fourth bent piece portion 67D extends along the X direction and the Y direction from the upper portion of the third contact surface portion 61. The upper surface of the fourth bent piece portion 67D supports the traveling surface portion 74 of the second travel rail 7 from below.

(2) In the above embodiment, an example is described in which the fourth contact surface portion 65 of the support member 60 and the first side surface 2a of the support column 2 are fastened with use of a bolt B (the first bolt B1). However, the present invention is not limited to such a configuration, and the fourth contact surface portion 65 of the support member 60 and the first side surface 2a of the support column 2 may be riveted together with use of rivets R, for example. In this case, the rivets R correspond to "first binding members".

(3) In the above embodiment, an example is described in which the side surface 50c of the second beam body 50 and the third contact surface portion 61 of the support member 60 are riveted with use of the rivets R. However, the present invention is not limited to such a configuration, and the side surface 50c of the second beam body 50 and the third contact surface portion 61 of the support member 60 may be fastened with use of a bolt B, for example. In this case, the bolt B corresponds to a "second binding member". Alternatively, the second beam body 50 and the support member 60 may be coupled by another joining method such as welding.

Figure 9:
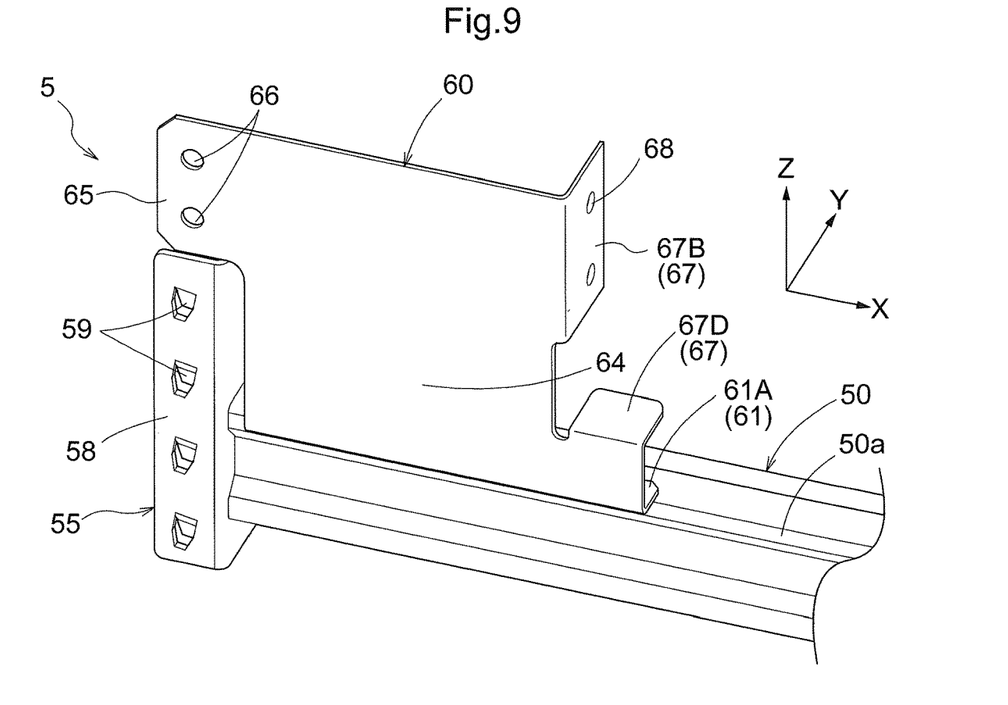
FIG. 9 is a perspective view of a portion of a support beam according to another aspect.

(4) In the above embodiment, an example is described in which the second beam body 50 and the support member 60 are fixed while the side surface 50c of the second beam body 50 and the third contact surface portion 61 of the support member 60 are in contact with each other. However, the present invention is not limited to such a configuration, and the second beam body 50 and the support member 60 may be fixed while the upper surface 50a of the second beam body 50 and the bent piece portion 61A of the support member 60 are in contact with each other as shown in FIG. 9, for example. The coupling of the upper surface 50a of the second beam body 50 and the bent piece portion 61A of the support member 60 to each other can be performed by various means such as fastening with use of bolts B, riveting with use of rivets R, or welding.

(5) In the above embodiment, an example is described in which the third contact surface portion 61, the extension portion 64, and the fourth contact surface portion 65, which constitute the support member 60, are flat plate-shape overall. However, the present invention is not limited to such a configuration, and portions of the aforementioned contact surface portions may be bent so as to intersect with other portions. For example, a configuration is possible in which the third contact surface portion 61 and the extension portion 64 are flat plate-shaped, whereas the fourth contact surface portion 65 is bent in the Y direction. In this case, the fourth contact surface portion 65 of the support member 60 comes into contact with the second side surface 2b of the support column, and the second side surface 2b corresponds to a "side surface".

(6) In the above embodiment, an example is described in which the first side surface 2a of the support column 2 includes the lock holes 21 as the "lock receiving portions", and the second contact surface portion 58 of the attachment member 55 includes the locking claws 59 as the "locking portions". However, the present invention is not limited to such a configuration, and a configuration is possible in which the first side surface 2a of the support column 2 is provided with locking claws as the "lock receiving portions", and the second contact surface portion 58 of the attachment member 55 is provided with lock holes as the "locking portions". Moreover, there is no limitation to using a combination of a locking claw and a lock hole, and the "locking portion" and the "lock receiving portion" may be configured by another means such as a combination of a hook portion and a shaft portion.

(7) The specific shapes of the portions described in the above embodiment and shown in the drawings are merely examples. The shape of each component can be changed as appropriate as long as equivalent functionality can be exhibited.

(8) In the above embodiment, an example is described in which the X direction, the Y direction, and the Z direction are orthogonal to each other. However, the present invention is not limited to such a configuration, and any one direction among the X direction, the Y direction, and the Z direction may intersect the other two directions non-perpendicularly (i.e., at an angle other than 90°). Alternatively, the X direction, the Y direction, and the Z direction may intersect each other non-perpendicularly.

(9) In the above embodiment, an example of applying the technology of the present disclosure to the coupling between the support column 2 and the second beam unit 5 has been described. However, the present invention is not limited to such a configuration, and the technology of the present disclosure may be applied to the coupling between the support column 2 and the first beam unit 3, for example. Also, the technology of the present disclosure is not limited to being applied in an article transport facility 1 that includes an article transport vehicle 8 constituted by a main carriage and a sub carriage as in the above embodiment, and the technology of the present disclosure may be applied to the coupling between a support column 2 and a beam unit in an article transport facility 1 that includes an article transport vehicle 8 constituted by a carriage that simply travels back and forth.

(10) The configurations disclosed in the above-described embodiments (including the above-described embodiment and other embodiment, which similarly applies hereinafter) can be applied in combination with configurations disclosed in other embodiments as long as no contradiction arises. Regarding other configurations as well, the embodiments disclosed in this specification are examples in all respects, and can be modified as appropriate without departing from the scope of the present disclosure.

Overview of Embodiments

In summary, an article transport facility according to the present disclosure preferably has a configuration such as any of the following.

An article transport facility includes:
a rail extending along a first direction;
a transport vehicle configured to travel along the rail and transport an article;
a support column extending along an up-down direction; and
a support beam extending along a second direction intersecting the first direction in a vertical view along the up-down direction, the support beam being configured to be coupled to the support column and support the rail,
wherein the support column includes a lock receiving portion formed in a side surface of the support column,
the support beam includes:
a beam body extending along the second direction;
an attachment member configured to be attached to the support column; and
a support member configured to be fixed to the beam body and support the rail,
the attachment member includes:
a first fixing portion configured to be fixed to the beam body;
a first contact portion configured to come into contact with the side surface of the support column; and
a locking portion formed on the first contact portion,
the support member includes:
a second fixing portion configured to be fixed to the beam body;
a support portion configured to come into contact with the rail and support the rail; and
a first through hole at a position different from the support portion, and
the support beam and the support column are configured to be coupled by (i) the attachment member being attached to the support column by the locking portion being locked to the lock receiving portion, and (ii) the support member and the support column being bound together by a first binding member inserted through the first through hole.

According to this configuration, through using both the attachment of the attachment member to the support column by locking and the binding of the support member to the support column by the first binding member, it is possible to achieve both workability and strength for the coupling between the support beam and the support column. For example, compared to the case of achieving coupling by simply locking, binding with the first binding member makes it possible to increase the strength with respect to a load acting on the beam body. Also, compared to the case of achieving coupling with use of simply the first binding member, the number of first binding members can be reduced by an amount corresponding to the number of coupling points achieved by locking, and the amount of labor required for assembly can be reduced. As described above, according to the article transport facility of this configuration, it is possible to easily couple the support column and the support beam while also ensuring sufficient strength.

As another aspect,
it is preferable that the support member further includes a second contact portion configured to come into contact with the side surface of the support column at a position upward of the attachment member, and
the first through hole is provided in the second contact portion.

According to this configuration, the load acting on the beam body can be borne by the first binding member while the side surface of the support column and the second contact portion of the support member are in contact with each other. Accordingly, a load acting on the coupling between the support column and the support beam can be more effectively borne by the first binding member.

As another aspect,
it is preferable that the support member further includes a third contact portion configured to come into contact with a surface of the beam body, the surface facing one side in the first direction,
the second fixing portion includes a second through hole provided in the third contact portion, and
the support member and the beam body are configured to be fixed by the third contact portion and the beam body being bound together by a second binding member inserted through the second through hole.

According to this configuration, the number of welding points can be reduced compared to the case where the support member and the beam body are fixed by welding, for example, and thus the manufacturing cost can be reduced. Also, a load acting on the beam body can be borne by the second binding member in a state where the surface of the beam body facing one side in the first direction is in contact with the third contact portion of the support member. Accordingly, a load acting on the coupling between the support member and the beam body can be more effectively borne by the second binding member.

As another aspect,
it is preferable that the support member further includes an extension portion extending upward from the second fixing portion, and
the support portion and the first through hole are separated from each other respectively on one side of the extension portion and another side of the extension portion in the second direction.

According to this configuration, the rail can be supported on the upper side of the beam body, and thus that the rail can be stably supported by the support beam. Also, the rail can be supported on the side of the extension portion opposite to the first through hole (support column) in the second direction, and it is easier to realize a configuration in which a pair of rails are arranged facing each other between a pair of support columns.

As another aspect,
it is preferable that the support member further includes a hole forming portion in which the first through hole is formed, and a connecting portion that connects the second fixing portion and the hole forming portion, and
the second fixing portion, the hole forming portion, and the connecting portion are flat plate-shaped.

According to this configuration, it is possible to increase the rigidity of the portion of the support member that couples the support column and the beam body, and it is possible to increase the strength against a load acting on the beam body.

As another aspect,
it is preferable that the article transport facility further includes:
a second rail extending along the second direction;
a second transport vehicle configured to carry the transport vehicle and travel along the second rail; and
a second support beam extending along the first direction and configured to be coupled to the support column and support the second rail,
wherein the second transport vehicle includes an in-vehicle rail along which the transport vehicle travels, and
the in-vehicle rail and the rail are in a continuous positional relationship while the second transport vehicle is stopped at a predetermined position on the second rail.

According to this configuration, it is possible to realize an article transport facility that includes a transport vehicle that travels along a rail and transports an article, and a second transport vehicle that carries the transport vehicle and travels along a second rail. Also, it is possible to realize a support structure for the rails in the article transport facility while achieving both strength and workability.

The article transport facility according to the present disclosure need only achieve at least one of the effects described above.

DESCRIPTION OF REFERENCE SIGNS

1 Article transport facility
2 Support column
2a First side surface (side surface)
21 Lock hole (lock receiving portion)
22 Through hole
3 First beam unit (second support beam)
4 First travel rail (second rail)
5 Second beam unit (support beam)
50 Second beam body (beam body)
50c Side surface (surface facing one side in first direction)
55 Attachment member
56 First contact surface portion
57 First fixing portion
58 Second contact surface portion (first contact portion)
59 Locking claw (locking portion)
60 Support member
61 Third contact surface portion (third contact portion)
62 Second fixing portion
63 Through hole (second through hole)
64 Extension portion (connecting portion)
65 Fourth contact surface portion (second contact portion, hole forming portion)
66 Through hole (first through hole)
67 Support portion
7 Second travel rail (rail)
8 Article transport vehicle
8A Main carriage (second transport vehicle)
83 In-vehicle rail
8B Sub carriage (transport vehicle)
B1 First bolt (first binding member)
R Rivet (second binding member)
W Article
X X direction (second direction)
Y Y direction (first direction)
Z Z direction (up-down direction)

What is claimed is:

1. An article transport facility comprising:
a rail extending along a first direction;
a transport vehicle configured to travel along the rail and transport an article;
a support column extending along an up-down direction; and
a support beam extending along a second direction intersecting the first direction in a vertical view along the up-down direction, the support beam configured to be coupled to the support column and support the rail,
wherein:
the support column comprises a lock receiving portion formed in a side surface of the support column,
the support beam comprises:
a beam body extending along the second direction;
an attachment member configured to be attached to the support column; and
a support member configured to be fixed to the beam body and support the rail,
the attachment member comprises:
a first fixing portion configured to be fixed to the beam body;
a first contact portion configured to come into contact with the side surface of the support column; and
a locking portion formed on the first contact portion,
the support member comprises:
a second fixing portion configured to be fixed to the beam body;
a support portion configured to come into contact with the rail and support the rail;
a third contact portion configured to come into contact with a surface of the beam body, the surface facing one side in the first direction;
a first through hole at a position different from the support portion, and
the support beam and the support column are configured to be coupled by (i) the attachment member attached to the support column by having the locking portion locked to the lock receiving portion, and (ii) with the support member and the support column bound together by a first binding member inserted through the first through hole.

2. The article transport facility according to claim 1, wherein the support member further comprises a second contact portion configured to come into contact with the side surface of the support column at a position upward of the attachment member, and
wherein the first through hole is provided in the second contact portion.

3. The article transport facility according to claim 1, wherein:

the second fixing portion includes a second through hole provided in the third contact portion, and the support member and the beam body are configured to be fixed by the third contact portion and the beam body and bound together by a second binding member inserted through the second through hole.

4. The article transport facility according to claim 1, wherein the support member further comprises an extension portion extending upward from the second fixing portion, and wherein the support portion and the first through hole are separated from each other respectively on one side of the extension portion and another side of the extension portion in the second direction.

5. The article transport facility according to claim 1, wherein the support member further comprises a hole forming portion in which the first through hole is formed, and a connecting portion that connects the second fixing portion and the hole forming portion, and wherein the second fixing portion, the hole forming portion, and the connecting portion are flat plate-shaped.

6. The article transport facility according to claim 1, further comprising:

a second rail extending along the second direction;

a second transport vehicle configured to carry the transport vehicle and travel along the second rail; and a second support beam extending along the first direction and configured to be coupled to the support column and support the second rail, wherein the second transport vehicle comprises an in-vehicle rail along which the transport vehicle travels, and wherein the in-vehicle rail and the rail are in a continuous positional relationship while the second transport vehicle is stopped at a predetermined position on the second rail.

7. The article transport facility according to claim 1, wherein the support member further comprises a second contact portion configured to come into contact with the side surface of the support column, and wherein the third contact portion is co-planar with the second contact portion.

8. The article transport facility according to claim 1, wherein a plurality of the support columns are provided along the second direction, and wherein the support beam is provided between a pair of the support columns adjacent to each other in the second direction.

9. The article transport facility according to claim 1, wherein the rail has a traveling surface portions on which traveling wheel of the transport vehicle rolls on, and wherein the first through hole is provided above the traveling surface.

10. The article transport facility according to claim 9, wherein the support member further comprises a second contact portion configured to come into contact with the side surface of the support column above the attachment member, wherein the first through hole is provided in the second contact portion, and wherein the second contact portion including the first through hole is provided above the traveling surface.

11. The article transport facility according to claim 1, wherein the attachment member and the support member are fixed to the beam body while being separated from each other in the second direction.

* * * * *